Nov. 14, 1933.  E. J. O'NEILL  1,935,518
MACHINE FOR MAKING SANITARY NAPKINS
Filed Aug. 31, 1932  8 Sheets-Sheet 1

Fig. 1.

Inventor
Edward J. O'neill

Nov. 14, 1933.   E. J. O'NEILL   1,935,518
MACHINE FOR MAKING SANITARY NAPKINS
Filed Aug. 31, 1932   8 Sheets-Sheet 4

Inventor
Edward J. O'neill

Geo. P. Kimmel
Attorney

Nov. 14, 1933.  E. J. O'NEILL  1,935,518
MACHINE FOR MAKING SANITARY NAPKINS
Filed Aug. 31, 1932  8 Sheets-Sheet 6

Inventor
Edward J. O'Neill
By
Geo. P. Kimmel
Attorney

Nov. 14, 1933.  E. J. O'NEILL  1,935,518

MACHINE FOR MAKING SANITARY NAPKINS

Filed Aug. 31, 1932  8 Sheets-Sheet 7

Inventor
Edward J. O'neill

By Geo. P. Kimmel
Attorney

Patented Nov. 14, 1933

1,935,518

UNITED STATES PATENT OFFICE 1,935,518

MACHINE FOR MAKING SANITARY NAPKINS

Edward J. O'Neill, Syracuse, N. Y.

Application August 31, 1932. Serial No. 631,295

31 Claims. (Cl. 223—15)

My invention relates to a machine for making sanitary napkins.

The essential object of my invention is to simplify and improve the constructive arrangement of the machines forming the subjects of Letters Patent No. 1,845,436 granted to me February 16, 1932 and my application Serial No. 598,055 filed March 10, 1932; and further objects of the invention are to conserve time, space and labor in the manufacture of sanitary napkins and to produce the latter in a uniform manner; to improve the form of and to increase the efficiency of a part of the machine i. e., the cutting mechanism for the folded covering material for the pads which combined with the latter provides the napkins; to improve the construction and efficiency of another part of the machine i. e., the conducting mechanism for alternately conducting pads from a pair of pad cutting mechanisms to a pad guide and feeding mechanism positioned at the entrance end of a covering material folding mechanism; to provide the machine with a combined guide and feeding mechanism for successively positioning the pad on the covering material therefor; to simplify the construction and arrangement of the operating means for the pad forming material feeding mechanism, the pad conducting mechanism, the covering material conducting mechanism and the covering material cutting mechanism to thereby attain a more efficient operation of such mechanisms; to provide a new and novel form of combined pad guide and feeding mechanism acting on the pads for depositing them successively upon the covering material therefor at the intake end of the covering material folding mechanism; and to attain these ends in a strong, durable, compact, thoroughly efficient, conveniently repaired, readily assembled and comparatively inexpensive structure.

To the above ends and to others which may hereinafter appear, my invention consists of such parts, and such combination of parts which fall within the scope of the invention as claimed.

In the drawings:

Figures 6, 7 and 8 are respectively sections taken on lines 6—6, 7—7 and 8—8 Figure 4.

Referring to the drawings in detail, the machine includes a skeleton frame upon which the working parts of the machine are mounted. The frame includes a forward part A, an intermediate part B and a rear part C. The parts A and B are of the same width, but the latter is of greater height than that of the former. The parts B and C are of the same height but the latter is of greater width than the former.

The machine includes pad forming and feeding means arranged upon frame part C. Assembling means for the pads and covering are supported upon frame part B, and severing means is carried by frame part A for the covering to provide the napkins. The pads are formed on frame part C and fed to the covering upon frame part B.

Figure 1:
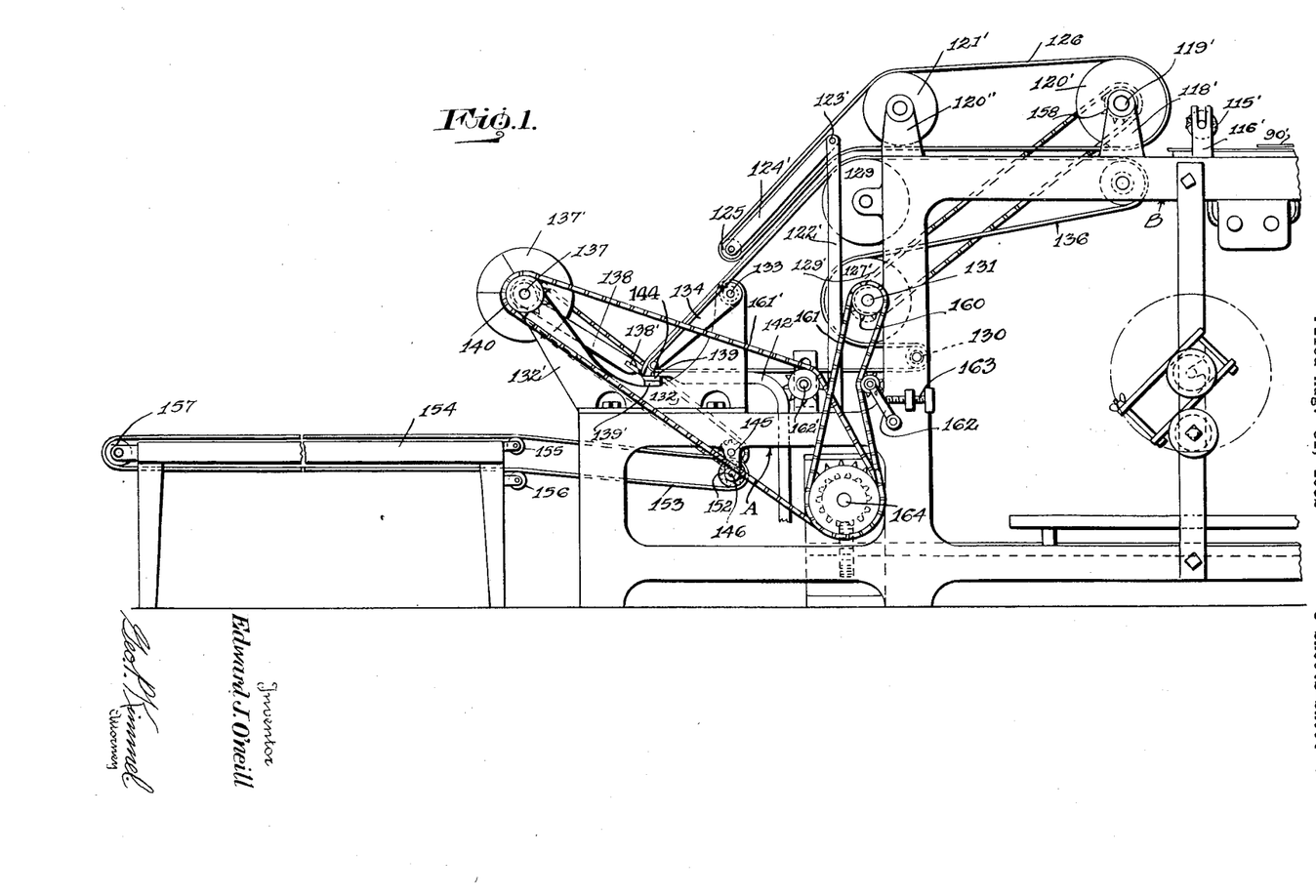
Figures 1 and 2 when taken together illustrate the machine in side elevation.
Figure 2:
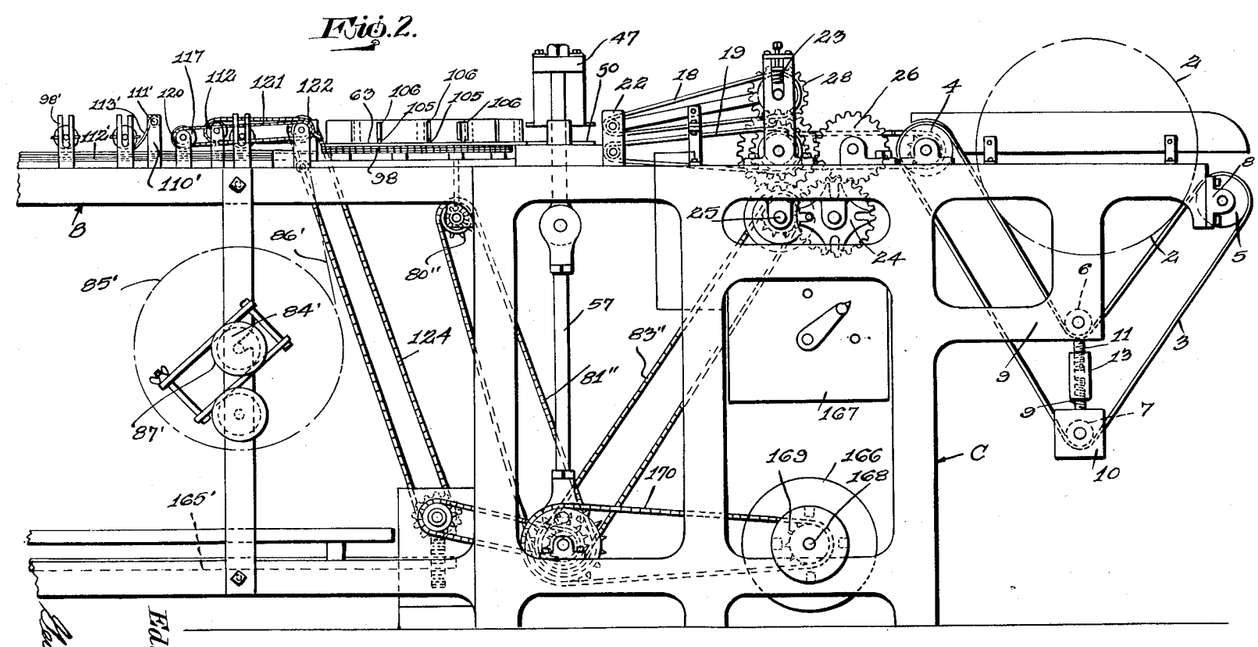
Figures 3, 12:
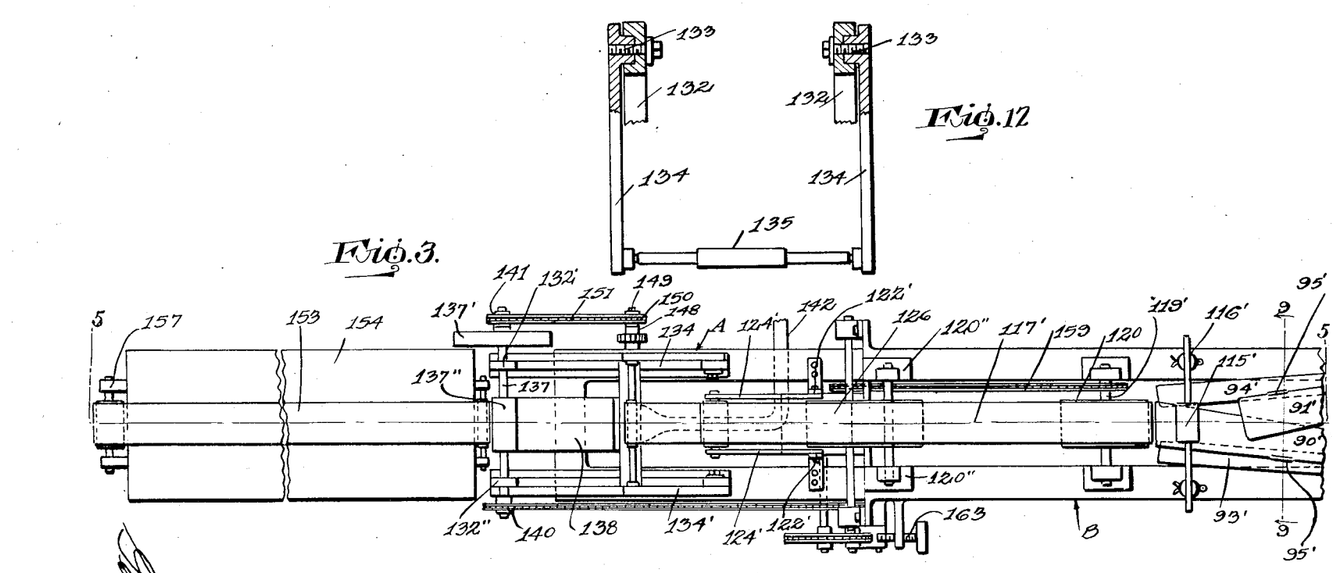
Figures 3 and 4 when taken together illustrate the machine in top plan.
Figure 12 is a sectional detail illustrating the means for positioning the covered pads to be cut into napkins.
Figure 4:
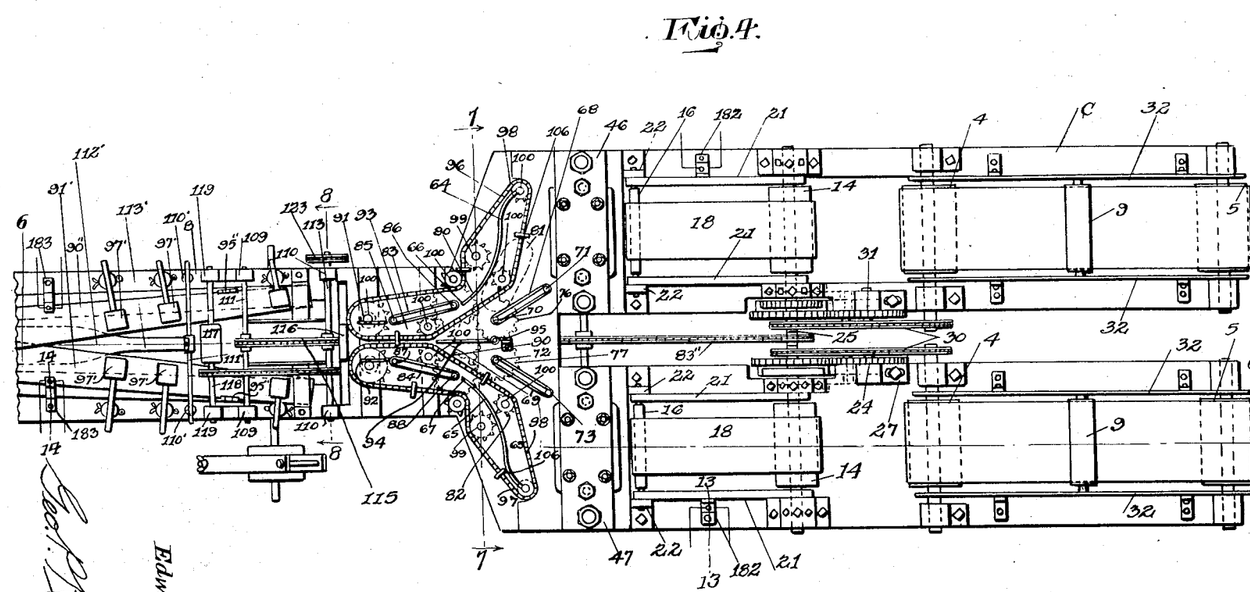

With reference to Figures 2 and 4, there is positioned within the frame part C a pair of endwise, opposed, spaced rolls 2 of absorbent material of web-like form. Each roll is supported by an endless belt 3 travelling over upper rollers 4, 5 and lower rollers 6, 7. Roller 4 is supported transversely of the top of frame part C, roller 5 is journaled in spaced brackets 8 secured to the rear end of frame part C, roller 6 is journaled in the lower end of hangers 9 integral with frame part C and roller 7 is journaled in a pair of suspended bearings 10. The hangers 9 have depending therefrom threaded bars 11. The bearings 10 have extending upwardly therefrom threaded bars 12. The bars 11 are arranged in alignment with the bars 12. Threadedly engaging with each pair of aligning bars is an interiorly threaded sleeve 13 for adjusting a bearing relative to a hanger to tension belt 3 when desired. The rollers 6, 7 are arranged in superposed relation and between rollers 4, 5. The arrangement of the rollers provides for the belt 3 to be of V-form. Associated with each roll 2 is an unwinding means for the web thereof and which will now be referred to.

Supported from the top of frame part C, forwardly of each roller 4 is a pair of superposed, spaced rollers 14, 15 and supported from the top of frame part C forwardly of the rollers 14, 15 is a pair of superposed spaced rollers 16, 17 of less diameter than the rollers 14, 15. The roller 14 coacts with roller 16 for supporting an endless belt 18. The roller 15 coacts with roller 17 for supporting an endless belt 19. The belts 18, 19 are arranged in superposed spaced relation and the opposed stretches of such belts extend at a downward inclination from rollers 14, 15. The web which is drawn from either roll 2 is indicated at 20. The shaft of the roller 14 carries a pair of arms 21 and the latter have their forward ends pivotally mounted in brackets 22 and carry the roll 16. The roll 17 is supported by brackets 22. The shaft of roller 14 is mounted in cushioning bearings 23 therefor. The roller 15 is driven by means of an intermittent gearing indicated generally at 24 which is operatively connected with a shaft 25 extending transversely of the frame part C. The gearing 24 includes an idler gear 26 so mounted in a bracket 27 adjustable lengthwise of the frame part C in order that gear 26 may have a similar gear substitute therefor when more or fewer teeth are desired. The shaft of roller 14 is rotated by means of a gear 28 meshing with a gear 29 carried by the shaft of the roller 15. The roller 4 is operated by means of a chain 30 driven from a sprocket on the shaft of roller 14. The foregoing assembly of belts, rollers and gears is located within the frame part C. The duplicate assembly is also located within frame part C and opposes in spaced relation the other assembly. The duplicate assembly includes an intermittent gearing 31 similar to the gearing 24 and also driven from shaft 25. The gearings 24 and 31 are so arranged with respect to each other and to shaft 25 that the webs 20 at the opposite sides of the frame part C will be fed alternately. The rolls 2 are maintained in position on their respective belts by means of elongated guides 32 adjacent each end of each roll 2.

With reference to Figures 2, 4 and 15 to 18 there is disposed within the path of each web 20 and arranged on frame part C a cutter mechanism preferably of the type described and shown in my patent and application referred to. The cutter mechanisms are indicated generally by the numerals 46 and 47 and are arranged in alignment transversely of the machine. Each cutter mechanism includes a stationary plate 48 formed with a substantially I-shaped slot 49. Carried by the plates 48 are a pair of spaced die plates 50 which are of less length than the slot 49. The opposing edges of the plates 50 are formed with rounded corners 51 to conform with the contour of the slot 49, and the plates are arranged with their opposing edges flush with the edge faces of the slot. Slidably extending through the plate 48, at opposite ends of the slot 49 are a pair of rods 52 having a plate 53 connected to the upper ends thereof. Depending from the plate 53 is a cutter blade 54 which is shaped to snugly pass through the slot 49 between and at the sides of the plate 50. The blade 54 has a cutting edge 55 which inclines upwardly from the ends thereof toward the center thereof and corresponds in length to the die plates 50. The rods 52 of each of the cutter mechanisms 46 and 47 are connected at their lower ends by means of rods 56. The rods 56 are pivotally connected with connecting rods 57 which are driven from a crank shaft 58 extending transversely of the frame. The connecting rods of the cutter mechanisms are connected with the crank shaft 58 in a manner to operate the cutter mechanisms alternately.

The web 20 is discharged from between the belts 18 and 19 onto the die plates 50. While the material is seated on the die plates 50, the blade 54 is lowered through the slot 49 whereby an end portion of the web 20 is cut off, with such portion, as well as the forward end of the web having rounded corners. The blade 54 is then raised while the material is again advanced over the die plates 50, after which the blade 54 is again lowered through the slot 49 to cut off another end portion of the web 20. Thus it will be seen that successive downward movement of the blade 54 forms the front and rear edge respectively of a pad 33 having rounded corners as indicated at 59. Prior to the contact of the blade 54 with the web 20, the latter is firmly held in position by means of a pair of presser plates 60 located on opposite sides of the blade 54. Each of the plates 60 is secured to the lower end of a pair of rods 61 slidably extending through the plate 53 and provided at their upper ends with stop nuts 62. When the plate 53 is in its raised position the presser plates 60 depend below the cutting edge of the blade 54 in order that the plates 60 will be lowered into contact with the web 20 before the latter is engaged by the blade 54. When the plate 53 is moved to its raised position, the plates 60 remain stationary until the plate 53 engages the stop nuts 62 in order to prevent the pads 33 from sticking to the blade 54.

With reference to Figures 2, 4, 5 and 7, there is disposed forwardly of the cutter mechanisms 46, 47 and supported from the forward end of frame part C and rear end of frame part B a mechanism for conducting the pads, formed by the cutter mechanisms, to the covering material folding mechanism, which latter will be presently referred to. The pad conducting mechanism includes a substantially Y-shaped tray 63 for receiving the pads 33 from the cutter mechanisms. The wide part of tray 63 has extending upwardly therefrom a pair of spaced oppositely disposed inclined ribs 64, 65 of compound curvature having their forward end portions 66, 67 positioned in spaced relation and arranged substantially at the point of joinder of the wide part of tray 63 with its narrow part. The latter is disposed centrally with respect to the forward edge of the wide part. Each rib opposes in spaced relation a cutter mechanism. Arranged on tray 63 between ribs 64, 65 and mechanisms 46, 47 are a pair of oppositely inclined endless travelling belts 68, 69 each arranged on a lengthwise edge. The belt 68 travels around a pair of vertically disposed spaced rolls 70, 71. The belt 69 travels around a pair of spaced vertically disposed rolls 72, 73. The rolls 71, 73 are idler rolls and supported from tray 63. The rolls 70, 72 are provided with depending shafts 74, 75 respectively extending below tray 63 and carrying horizontally disposed gears 76, 77 respectively which mesh with each other. Shaft 75 is of greater length than shaft 74 and carries a worm pinion 78 which meshes with a worm pinion 79 on a drive shaft 80. The belts 68, 69 coact with the ribs 64, 65 respectively to provide a pair of rear pad passages 81, 82 respectively, the former leading from mechanism 46 and the latter from mechanism 47. The ribs and belts form the side wall portions of the passages. Arranged on the narrow part of tray 63 is a pair of oppositely inclined endless travelling belts 83, 84, each arranged on a lengthwise edge. The belt 83 travels around a pair of spaced vertical rolls 85, 86. The belt 84 travels around a pair of spaced vertical rolls 87, 88. The rolls 85, 87 are idler rolls and supported from tray 63. The rolls 86, 88 are provided with depending shafts 89 respectively extending below tray 63 and carrying horizontally disposed gears 90 respectively meshing with each other and also meshing with the gears 76, 77. The rear ends of belts 83, 84 oppose and are arranged in close proximity to the ends 66, 67 respectively of the ribs 64, 65 respectively. Extending forwardly from and opposing the forward ends of the belts 83, 84 are a pair of parallel vertically disposed spaced ribs 91, 92 respectively. The belts 83, 84 and ribs 91, 92 coact to provide a forward pad passage 93 and form side wall portions of such passage.

Figure 5:
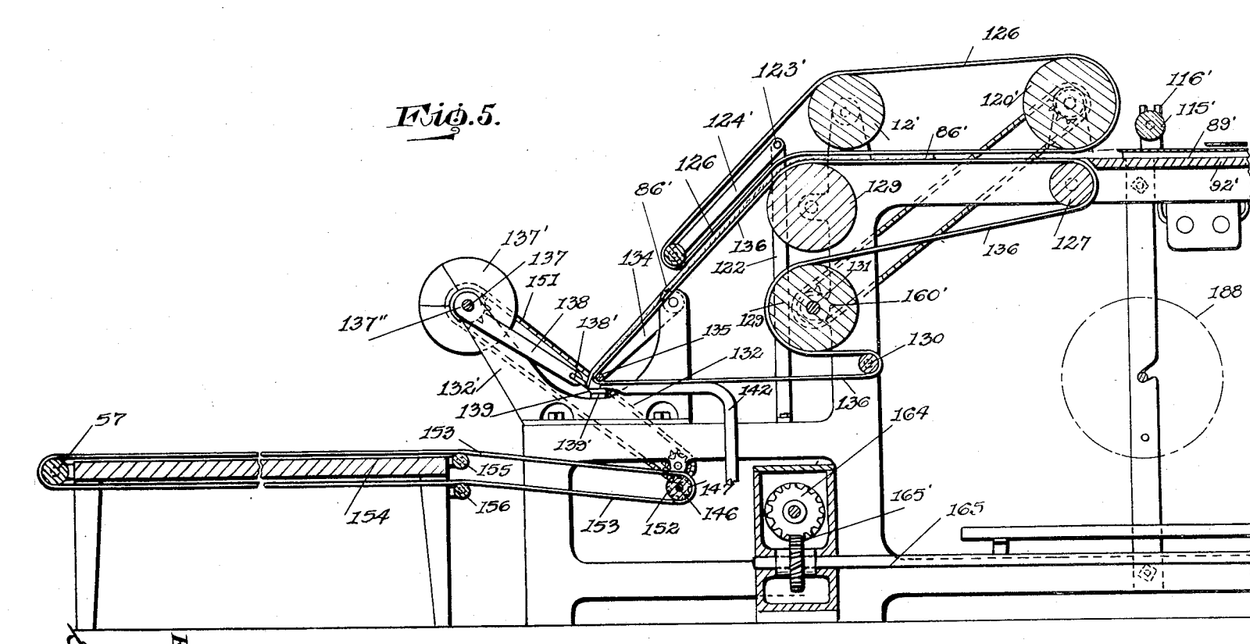
Figure 5 is a section on line 5—5 Figure 3.

Positioned on the tray 63 between the forward end of and spaced from the ribs 64, 65, as well as being arranged between the forward portions of belts 68, 69 is a forwardly extending resilient alternately shiftable wall forming and pad directing member 94 of a length to have its forward portion arranged between and in spaced relation to the rim portions of the belts 83, 84. The member 94 is shifted in one direction by a pad from the cutter mechanism 46 and in the other direction by a pad from the cutter mechanism 47. The rear end of member 94 is secured to a holder 95 on tray 63. The member 94 is common to passages 81, 82 and 93, and it functions to form a continuation of the inner side wall of passage 81 to close the latter to passage 82 and to direct a pad to enter into the rear end of passage 93 when member 94 is shifted by a pad from cutter mechanism 46 and it also functions to form a continuation of the inner side wall of passage 82 to close the latter to passage 81 and to direct a pad to enter into the rear end of passage 93, when member 94 is shifted by a pad from cutter mechanism 47. The resiliency of the member 94 is such that it will not retard the travel of the pads when the latter are to enter the rear end of passage 93. The travelling wall forming portions of the passages prevent any possibility of the pads clogging, jamming or being retarded when they are being conducted through the passages 81, 82 and 93.

The tray 63 is cut out to provide a pair of oppositely disposed endless slots 96, 97, one surrounding the rib 64, belt 83 and rib 91, the other surrounding the rib 65, belt 83 and rib 92. A stretch of slot 96 is arranged in passage 81 and passage 93. A stretch of slot 97 is arranged in passage 82 and passage 93. Positioned below each slot is an endless chain 98. Each chain passes around a drive sprocket 99 and a plurality of idler sprockets 100. The drive sprockets are mounted on the upper ends of vertical shafts 101 carrying bevel pinions 102 which mesh with and are driven from beveled gears 103 on shaft 80. The shafts 80 and 101 are journaled in and supported by frame portions 104 near the top of frame part C. Each chain 98 is provided with a set of upstanding spaced stems 105 projecting up through an endless slot and each stem at its upper end carries a vertically disposed pusher 106. The pads 33 as they are moved forwardly from the cutter mechanism 46, 47 are engaged by the pushers during the travel of the chains and are conducted through the pad passages to position them successively upon a combined pad guide and feeding mechanism arranged over the intake end of the covering material folding mechanism to be referred to. The combined pad guide and feeding mechanism deposits the pads successively upon a depressed portion of the covering material, after which the pads are covered by the latter. The covering material is severed in desired lengths and with each length enveloping and extending from the ends of a pad to complete the sanitary napkin.

The combined pad guide and feeding mechanism is arranged over frame part B in proximity to the forward ends of chains 98 and comprises an inverted yoke shaped support 107 disposed transversely of and supported from frame part B carrying a channel shaped pad guide 108 disposed lengthwise of the latter. Arranged forwardly and rearwardly of guide 108 pairs of uprights 109, 110 respectively are secured to the sides of frame part B. Journaled in the uprights 109 is a shaft 111 provided centrally thereof with a sprocket pinion 112. Journaled in the uprights 110 is a shaft 113 provided centrally thereof with a sprocket pinion 114. The pinions 112, 114 are connected together by an endless chain 115 driven from pinion 114. The chain 115 carries a pad shifter 116 for travelling through guide 108 to abut the rear end of the pad 33 therein to feed the latter upon the forward end of guide 108 upon the covering material, and below a holding down roll 117 carried by a shaft 118 journaled in a pair of uprights 119 arranged forwardly of the uprights 109. Shaft 118 is provided with a sprocket pinion 120 which is engaged and driven by an endless chain 121 operating around a driving pinion 122 therefor carried by shaft 113. Secured to the latter, at one end thereof is a sprocket gear 123 driven from an endless chain 124.

Figure 6:
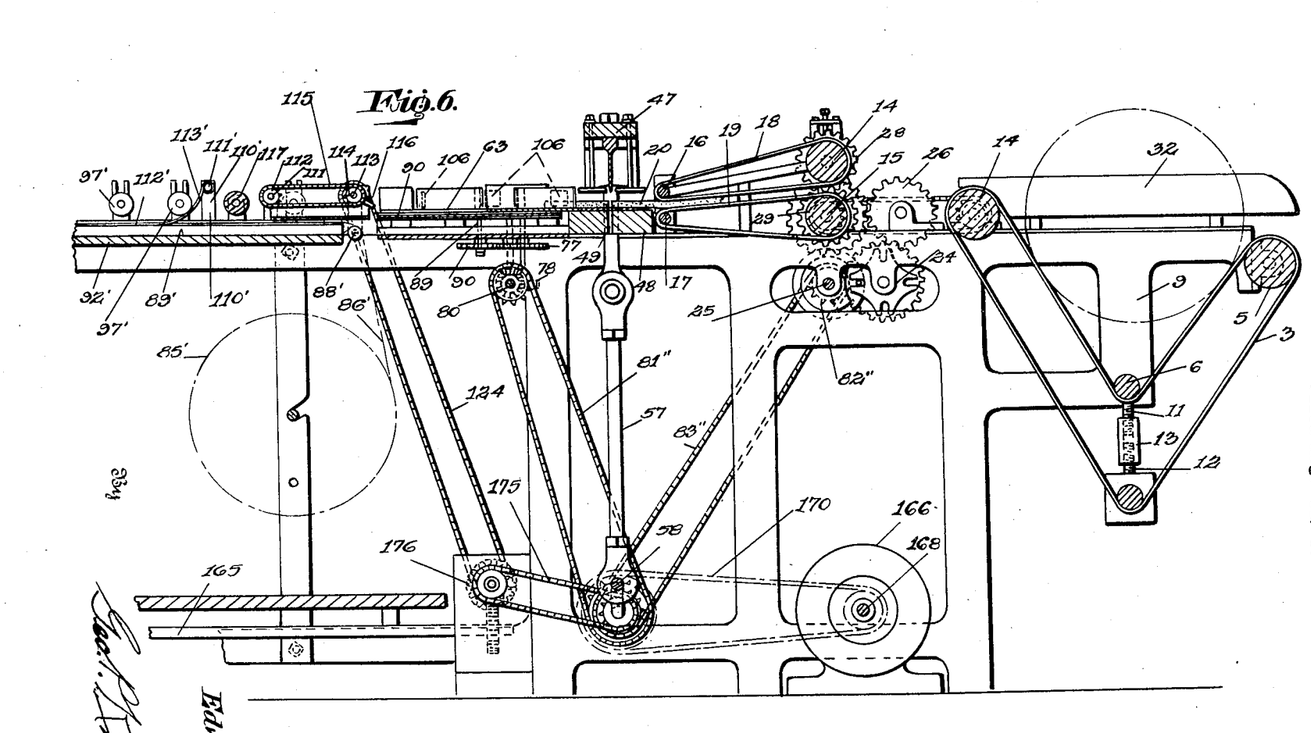

With reference to Figures 2, 4 and 6 there is journaled in, transversely of, below the top and in proximity to the rear end of frame part B a spindle 84' which carries a roll 85' of gauze and the web which winds off the roll 85' is indicated at 86'. The gauze provides a covering for the pads, and a length of the web 86' in connection with a pad provides the napkins. The pad is of less length than that of the gauze which encloses it. The roll 85' is arranged below the top of frame part B. One end of the spindle 84' has associated therewith a tensioning device 87' which serves as a brake and prevents slack in the web 86' as it unwinds from roll 85'.

Journaled upon the top of frame part B, above roll 85', and rearwardly of spindle 84' is a transversely disposed roll 88', constituting a guide for and over which passes the web 86'. On the operation of the machine, the web 86' passes forwardly upon a track 89' and upon a pair of flat elongated, oppositely disposed blades providing folders 90', 91' for the side marginal portions of the web 86'. The folders 90', 91' extend towards each other at opposite inclinations. The folder 90' is of greater length than that of and is arranged at a lower level than folder 91'. The forward end of folder 91' overlaps the folder 90'. The folders gradually increase in width from rear to front. The outer side edge of each folder is straight and its inner side edge inclined throughout.

The track 90' is provided by a rectangular plate or board 92' mortised in the top of and flush with each side of frame part B. Mounted upon and disposed lengthwise of the board 92' is a pair of elongated supporting members 93', 94' for the folders 90', 91' respectively. The members 93', 94' extend at an inclination towards each other from rear to front. The folders project inwardly from the inner side edges of the members 93', 94', extend at a greater inclination than that of the latter and are hinged, as at 95' to such members. The member 93' is of less height throughout than that of member 94'. The board 92' extends forwardly from the forward ends of members 93', 94' and folder 90'.

Figure 8:
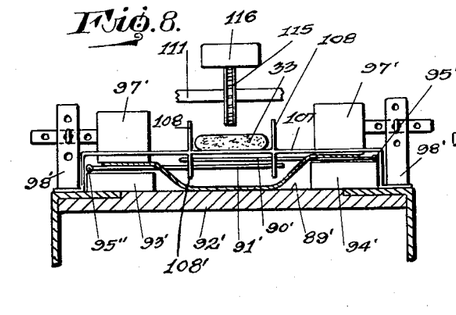
Figure 9:
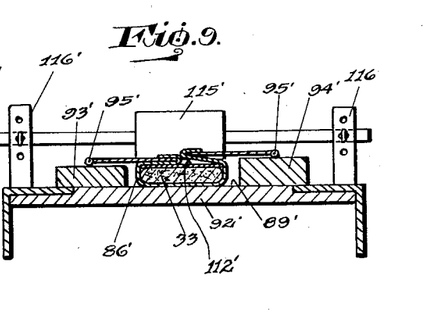
Figure 9 is a section on line 9—9 Figure 3.

The construction and arrangement of the folders with respect to the track 89' will provide for the web 86' to assume the positions shown in Figures 8 and 9. Spaced, opposed sets of spaced vertically and horizontally adjustable holding down rollers 97' are provided for the side marginal portions of the web 86'. One set is suspended over folder 90' and the other over folder 91'. The suspending means for the rollers 97' are indicated at 98' and are secured upon the sides of the frame part B. The folders act to provide for positioning the side marginal portions of the web 82' in overlapped relation with respect to each to encompass the pads 33' as shown in Figure 9.

Arranged forwardly of and in close proximity to the supports 119, is a pair of vertical supports 110' which are secured to the top of frame part B, and to the upper ends of which is attached a transversely extending rod 111'. Extending forwardly of the combined guide and pad feeding mechanisms, is a metallic blade 112' which seats upon the top of the pads 33' which are positioned upon the web 86'. The blade 112' has an upstanding curved reduced rear end part 113' which is secured to the rod 111' between supports 110'. That portion of blade 112' which seats upon the pads 33 is of the same width, as that of the latter, and prevents, when the marginal portions of web 86' are folded in overlapping relation with respect to the pad the distorting of the sides or the bunching of the pad body, whereby during the folding operation the pad will remain uniform. See Figure 9. The blade 112' extends in proximity to a guide roll 115' arranged over the top of frame part B and mounted in supports 116'. The roller 115' is arranged over the forward end of folder 90'.

Positioned at the forward end of the board 92' is a feed mechanism 117' for the purpose of positioning the folded web 86' to be severed into lengths with a pad 33 enveloped by each of the severed lengths of the web 86'. The severed lengths are uniform and are so cut that each will extend from each end of the pad and thereby provide the napkin. The mechanism 117' is arranged upon frame parts A and B and comprises a pair of upstanding supports 118' on frame part B. Journaled in the supports 118' is a shaft 119' carrying a roll 120'. Forwardly of the supports 118' is arranged a pair of supports 120'' having journaled therein a roll 121' of less diameter than and opposing roll 120'. Fixed to the frame part A directly in front of the forward end of frame part B is a pair of rigid upstanding rods 122' extending upwardly to a height greater than that of the top of frame part B. Secured at their upper ends as at 123' to the upper ends of the rods 122' is a pair of depending forwardly inclined arms 124' having journaled in the lower ends a roll 125. The roll 125 is of materially less diameter than that of rolls 120' and 121'. Travelling around the top, bottom and rear of roll 120', against the top and bottom of roll 121' and around the front, top and bottom of roll 125 and in a direction towards roll 120' is an endless confining and conveying belt 126 for the folded web 86'.

Arranged below the roll 120' and supported by frame part B is a roll 127. Supported in bearings 128 at the front of frame part B is a pair of superposed spaced rolls 129, 129'. Supported by frame part B below and rearwardly of roll 129' is a roll 130 of less diameter than that of rolls 127, 129 and 129'. Roll 127 is of less diameter than rolls 129, 129'. The shaft of roll 129' is indicated at 131. Secured upon the top of frame part A is a pair of upstanding opposed inverted yoke-shaped brackets 132. The upper ends of the rear arms of bracket 132 have connected thereto, as at 133 the upper ends of a pair of downwardly extending, forwardly inclined bars 134. The lower ends of bars 134 have journaled therewith a roll 135. Travelling around the rear, top and bottom of roll 127 over the top of roll 129, around roll 135, around roll 130, against the bottom, around the front and against the top of roll 129' and in a direction towards roll 127 is an endless feed belt 136, the latter being arranged relative to belt 126 whereby the bottom stretch of the latter will be positioned in spaced relation with respect to a part of the top stretch of the former. The forward part of the lower stretch of belt 126 is disposed at a downward inclination. The forward part of the upper stretch of belt 136 is also disposed at a downward inclination, but such inclined part is of a greater length than and extends forwardly from the inclined part of belt 126. The roll 125 is arranged above and spaced rearwardly of the roll 135 and its diameter is greater than that of the latter. The stretches coact to feed the folded web 86' in a direction towards a web cutter mechanism to be presently referred to and the lower stretch of belt 136 functions to present folded web 86' to such cutter mechanism for severance.

Supported by and at the upper ends of the forward arms 132' of the brackets 132 is the rotatable section of a cutter mechanism for severing the folded web 86' into lengths. The forward arms of brackets 132 are disposed at a forward inclination from bottom to top thereof to extend beyond the front end of frame part A. The brackets 132 also support the stationary section of the web cutting mechanism adjacent the front end of frame part A. The stationary section of such mechanism is positioned below, in close proximity to and extends slightly forward of roll 135. The web cutting mechanism includes a rotatable cutter shaft 137 journaled in and extended from the forward arms 132' of brackets 132. Carried by shaft 137 is a weighted balance or fly wheel 137' and a hub 137'' having extended therefrom and tangentially disposed with respect thereto a carrier 138 which has secured to and extended from its outer end a revoluble cutter 138' which associates with a stationary cutter 139 secured upon a supporting bar 139' attached to the brackets 132. The width of cutter 138' is less than that of cutter 139. Cutter 138' is disposed centrally with respect to cutter 139. The shaft 137 at its ends carries a pair of sprocket pinions 140, 141.

The rotatable section of the web cutting mechanism comprises elements 137, 137', 137'', 138, 138', and 140. The stationary section consists of elements 139, 139'.

To prevent the severed ends of web 86' from sticking to the cutter a blower device 142 is employed and which is arranged between brackets 132, supported from frame part A and is adapted to be connected to a suitable source of air supply. The mouth 144 of the device 142 is positioned between cutter 139 and roll 135.

Supported in hangers 145 depending from the top of frame part A is a shaft 146 carrying a pinion 147, which meshes with a pinion 148, mounted on stub shaft 149 fixed to one of the hangers 145 above shaft 146. Shaft 149 carries a revoluble unit comprising a sprocket 150 and the pinion 148. Driven from the sprocket 141, on shaft 137 is an endless chain 151, which engages with the sprocket 150 for operating the unit on shaft 149 thereby providing for the driving of shaft 146, the latter being provided with a fixed roll 152 for operating a conveyor belt 153, upon which the severed lengths of the web 86' are deposited for conveying them to a table 154, whereby an attendant can remove the napkin and fold the ends thereof in the desired manner. The table 154 is arranged forwardly of frame part A, and its rear has attached thereto a pair of superposed spaced rolls 155, 156. Upon the roll 155 travels the upper stretch of the belt 153 and against the roll 156 travels the lower stretch of the belt 153. The forward end of table 154 has supported therefrom a roll 157 around which travels the belt 153. The upper stretch of the latter is arranged over the top of table 154 and the lower stretch below the latter.

The shaft 119' of roll 120' is provided with a sprocket 158 which is engaged and driven by an endless chain 159. The shaft 128 of roll 129' is provided with a pair of sprockets 160, 160', the former being driven by an endless chain 161 and the latter drives the chain 159. The chain 161 travels against a pivoted, adjustable rotatable sprocket device 162 and the latter provides a tensioning means for the former. A horizontally movable adjusting element 163 is provided for adjusting the device 162 on its pivot for taking up slack in chain 161.

The sprocket 140 on shaft 137 of the web cutting mechanism is driven from an endless chain 161' which travels against a vertically adjustable tensioning device 162' therefor. The chains 161 and 161' are operated by a common driving means 164, the latter being operated from a transmission shaft 165 supported within the machine frame at the lower portion of the latter. There is a worm driving connection 165' between means 164 and shaft 165.

The shaft 80 carries centrally thereof a sprocket pinion 80'' driven from a chain 81''. The shaft 25 carries centrally thereof a sprocketed pinion 82'' driven from a chain 83''.

The moving parts of the machine are operated from an electric motor 166 connected with a control box 167. The shaft 168 of the motor is provided with a sprocket 169, which is connected by means of a chain 170 to a sprocket 171 on crank shaft 58. The latter carries centrally thereof a pair of sprockets 172, 173 for driving respectively chains 81'', 83''. Shaft 58 is also provided with a sprocket 174' for driving a chain 175 which operates a boxed gear mechanism 176 for driving chain 124 and shaft 165.

Figure 13:
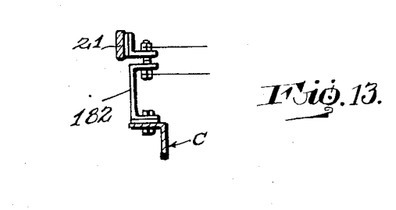
Figure 13 is a section on line 13—13 Figure 4.

A pair of normally closed switches 182 is employed for opening the motor circuit in the event of the pads 33 clogging, bunching or lumping between the opposed stretches of the belts 18, 19. See Figure 13. Each switch includes two contacts, one carried by the frame part C and the other by an arm 21 of a pair. When the pair of arms 21 is elevated, the contacts are separated thereby opening the motor circuit thereby stopping the operation of the machine.

Figure 14:
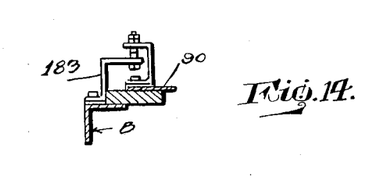
Figure 14 is a sectional detail.
Figure 15:
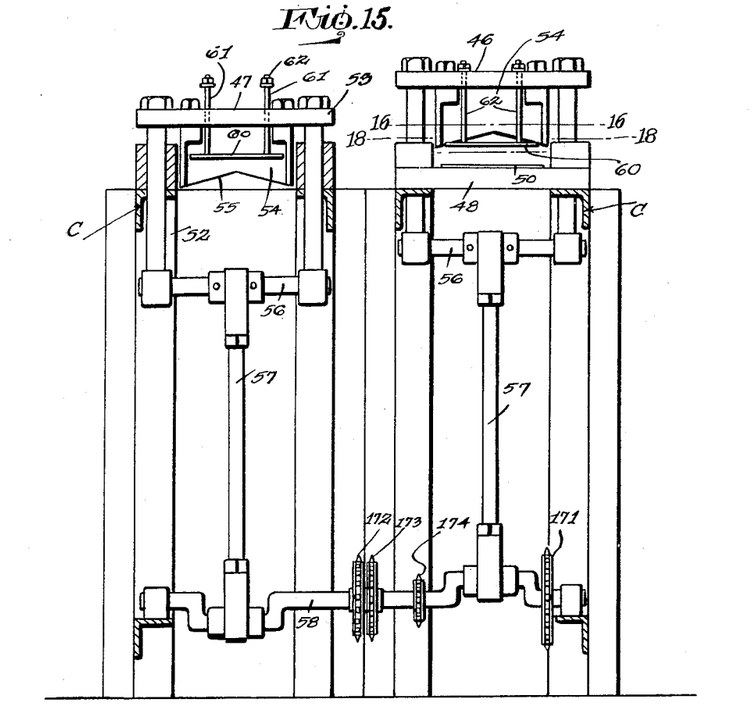
Figure 15 is a cross sectional view illustrating the pair of pad forming or cutting mechanisms.
Figure 16:
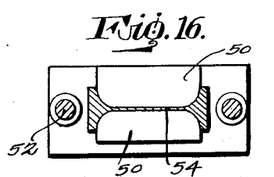
Figure 16 is a section on line 16—16 Figure 15.
Figure 17:
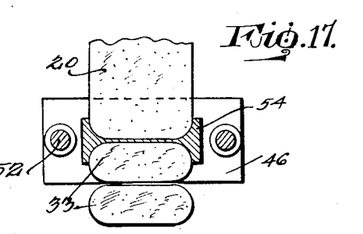
Figure 17 is a view similar to Figure 16 showing the material providing the pads with respect to a pad forming or cutting mechanism.
Figure 18:
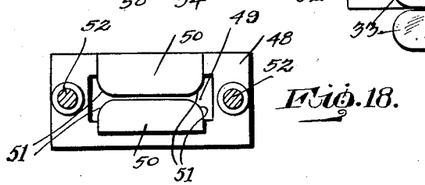
Figure 18 is a section on line 18—18 Figure 15.

A pair of normally closed switches 183 is employed for opening the motor circuit in the event of the web 86' clogging, bunching or lumping with respect to the folders. See Figure 14. Each switch includes two contacts, one carried by frame part B and the other by a folder. When a folder is elevated on its hinge by the clogged or bunched web 86', the pair of contacts are separated and the motor circuit opened, thereby stopping the operation of the machine.

The switches 182 and 183 are connected with the source of power for the motor through the control box 167.

In order to reduce to a minimum the length of time which is necessary to stop the machine upon the exhausting of the roll of gauze 85', a similar roll 188 is mounted on frame part B forwardly of roll 85'. Upon using all of the web 86' from roll 85', it is merely necessary to thread the web from roll 188 over the roller 88' in the same manner as shown with respect to web 86'.

Figure 10:
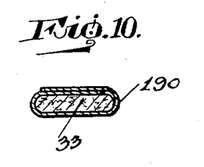
Figure 10 is a cross sectional view of the completed article.
Figure 11:
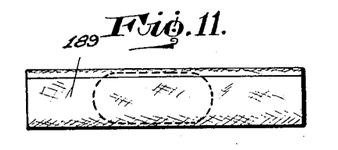
Figure 11 is a plan of the completed article.

In the operation of the machine, the web of gauze is moved continuously upon the folders and track 89'. The cutter mechanisms 46 and 47 operate alternately to discharge the pads 33 upon the tray 63. The web 20 is continuously moved towards the cutter mechanisms 46 and 47. A napkin as produced by the machine is shown by Figure 11 and indicated at 189. The length of the web 86 which envelopes a pad 33 is indicated at 190 Figure 10.

The cutter mechanism for the web 86' is so timed with respect to the travel of the latter so that the web 86' will be cut in a manner that the leading portion of length 190 with respect to pad 33 will be of the same area as the follower portion of the length with respect to the pad.

The pad guide and feeding mechanism referred to includes a pair of depending spaced parallel bars 108' which are integral with the member 108 and act to depress the central portion of web 86' as the latter passes from off roll 88' whereby such mechanism not only guides and positions the pads but further functions as a web depressor and will be termed a combined pad guide, pad feeding and web depressing mechanism.

What I claim is:—

1. In a machine for making sanitary napkins, the combination of a track, a cutter mechanism for successively severing a folded web of pad covering material into lengths, means for continuously shifting the web lengthwise of said track and to the said cutter mechanism, pad forming means, a combined pad guide, pad feeding and web depressing mechanism for successively positioning pads in spaced relation upon the depressed portion of the web, a pad conductor mechanism for receiving pads from said pad forming means and for conducting them to said combined guide, feeding and depressing mechanism, and means arranged over said track for folding the side marginal portions of the web, during the travel of the latter in overlapping relation to encompass the spaced pads positioned on the depressed portion of the web.

2. In a machine for making sanitary napkins, the combination of a track, a cutter mechanism including a stationary and a rotatable section coacting for successively severing a folded web of pad covering material into lengths, said rotatable section having a weighted balance wheel, means for continuously shifting the web lengthwise of said track and to the said cutter mechanism, pad forming means, a combined pad guide, pad feeding and web depressing mechanism for successively positioning pads in spaced relation upon the depressed portion of the web, a pad conductor mechanism for receiving pads from said pad forming means and for conducting them to said combined guide, feeding and depressing mechanism, and means arranged over said track for folding the side marginal portions of the web, during the travel of the latter in overlapping relation to encompass the spaced pads positioned on the depressed portion of the web.

3. In a machine for making sanitary napkins, the combination of a track, a cutter mechanism including a stationary section and a rotatable section coacting with the stationary section for successively severing a folded web of pad covering material into lengths, said rotatable section having a weighted balance wheel and a cutter disposed substantially radially of such section, means for continuously shifting the web lengthwise of said track and to the said cutter mechanism, pad forming means, a combined pad guide, pad feeding and web depressing mechanism for successively positioning pads in spaced relation upon the depressed portion of the web, a pad conductor mechanism for receiving pads from said pad forming means and for conducting them to said combined guide, feeding and depressing mechanism, and means arranged over said track for folding the side marginal portions of the web, during the travel of the latter in overlapping relation to encompass the spaced pads positioned on the depressed portion of the web.

4. In a machine for making sanitary napkins, the combination of a track, a stationary cutter located forwardly of said track, a rotatable shaft positioned forwardly of and above said cutter, a weighted balance wheel on said shaft, a hub fixed to the latter, an arm secured to the hub, disposed substantially radially of the shaft for moving in a path towards said cutter, a cutter carried by the arm and coacting with the stationary cutter for successively severing a folded web of pad covering material into lengths, means for continuously shifting the web lengthwise of the track and to the said stationary cutter, pad forming means, a combined pad guide, pad feeding and web depressing mechanism for successively positioning pads in spaced relation upon the depressed portion of the web, a pad conductor mechanism for receiving pads from said pad forming means and for conducting them to said combined guide, feeding and depressing mechanism, and means arranged over said track for folding the side marginal portions of the web, during the travel of the latter in overlapping relation to encompass the spaced pads positioned on the depressed portion of the web.

5. In a machine for making sanitary napkins, the combination of a track, a cutter mechanism for successively severing a folded web of pad covering material into lengths, means for continuously shifting the web lengthwise of said track and to said cutter mechanism, pad forming means, a combined pad guide, pad feeding and web depressing mechanism for successively positioning pads in spaced relation upon the depressed portion of said web, a pad conductor mechanism for receiving pads from said forming means and for conducting them to said combined guide, feeding and depressing mechanism, said conductor mechanism including pad passages formed with side walls having fixed and travelling portions, and means arranged over said track for folding the side marginal portions of the web, during the travel of the latter, in overlapping relation to encompass the spaced pads positioned on the depressed portion of the web.

6. In a machine for making sanitary napkins, the combination of a track, a cutter mechanism for successively severing a folded web of pad covering material into lengths, means for continuously shifting the web lengthwise of said track and to said cutter mechanism, pad forming means, a combined pad guide, pad feeding and web depressing mechanism for successively positioning pads in spaced relation upon the depressed portion of said web, a pad conductor mechanism for receiving pads from said forming means and for conducting them to the said combined pad guide, pad feeding and web depressing mechanism, said conductor mechanism including a front pad passage and a pair of rear pad passages for alternate communication with said front passage, each of said rear passages having a fixed and a travelling side wall, said front passage having fixed and travelling side wall portions, and means arranged over said track for folding the side marginal portions of the web, during the travel of the latter, in overlapping relation to encompass the spaced pads positioned on the depressed portion of the web.

7. In a machine for making sanitary napkins, the combination of a track, a cutter mechanism for successively severing a folded web of pad covering material into lengths, means for continuously shifting the web lengthwise of said track and to the said cutter mechanism, pad forming means, a combined pad guide, pad feeding and web depressing mechanism for successively positioning pads in spaced relation upon the depressed portion of the web, a pad conductor mechanism for receiving pads from said pad forming means and for conducting them to the said combined pad guide, pad feeding and web depressing mechanism, means arranged over said track for folding the side marginal portions of the web, during the travel of the latter in overlapping relation to encompass the spaced pads positioned on the depressed portion of the web, and a pad holding down element arranged forwardly of and in close proximity to the forward end of the said combined pad guide, pad feeding and web depressing mechanism.

8. In a machine for making sanitary napkins, the combination of a track, a cutter mechanism including a stationary and a rotatable section coacting for successively severing a folded web of pad covering material into lengths, said rotatable section having a weighted balance wheel and a cutter disposed substantially radially thereof, means for continuousy shifting the web lenthwise of said track and to the said cutter mechanism, pad forming means, a combined pad guide, pad feeding and web depressing mechanism for successively positioning pads in spaced relation upon the depressed portion of the web, a pad conductor mechanism for receiving pads from said pad forming means and for conducting them to the said combined pad guide, pad feeding and web depressing mechanism, means arranged over said track for folding the side marginal portions of the web, during the travel of the latter in overlapping relation to encompass the spaced pads positioned on the depressed portion of the web, and a pad holding down element arranged forwardly of and in close proximity to the forward end of said combined pad guide, pad feeding and web depressing mechanism.

9. In a machine for making sanitary napkins, the combination of a track, a cutter mechanism for successively severing a folded web of pad covering material into lengths, means for continuously shifting the web lengthwise of said track and to said cutter mechanism, pad forming means, a combined pad guide, pad feeding and web depressing mechanism for successively positioning pads in spaced relation upon the depressed portion of said web, a pad conductor mechanism for receiving pads from said forming means and for conducting them to the said combined pad guide, pad feeding and web depressing mechanism, said conductor mechanism including pad passages formed with side walls having fixed and travelling portions, means arranged over said track for folding the side marginal portions of the web, during the travel of the latter, in overlapping relation to encompass the spaced pads positioned on the depressed portion of the web, and a pad holding down element arranged forwardly of and in close proximity to the forward end of the said combined pad guide, pad feeding and web depressing mechanism.

10. In a machine for making sanitary napkins, a pad conductor mechanism for conducting pads from a pad forming means to be enveloped by a length of covering material, said conductor mechanism including a tray provided with opposed spaced upstanding elements forming a pad passage, one of said elements consisting of an endless travelling belt standing on one of its lengthwise edges.

11. In a machine for making sanitary napkins, a pad conductor mechanism for conducting pads from a pad forming means to be enveloped by a length of covering material, said conductor mechanism including a tray provided with oppositely extending pairs of upstanding spaced elements forming a pair of oppositely extending rear pad passages, one of the elements of each pair consisting of an endless travelling belt standing on one of its lengthwise edges, said tray further formed with opposed spaced upstanding elements providing a forward pad passage having a part of each of its walls formed of an endless travelling belt standing on one of its lengthwise edges, pad actuated means on the tray for alternately closing the rear passages to the forward passage, and means for simultaneously imparting a travelling movement to the belts.

12. In a machine for making sanitary napkins, a pad conductor mechanism for conducting pads from a pad forming means to be enveloped by a length of covering material, said conductor mechanism including a tray provided with opposed spaced pairs of upstanding elements to provide a pad passage, one of the elements of each pair being stationary and the other in the form of an endless travelling belt standing on one of its lengthwise edges.

13. In a machine for making sanitary napkins, a combined pad guide, pad feeding and web depressing mechanism for successively feeding pads in spaced relation upon the depressed portion of a travelling web of pad covering material, said mechanism including a support adapted to be arranged over and transversely of the web, a guide carried by the support and through which travels the pad, travelling means for contact with the rear end of a pad for shifting the latter through said guide for depositing it upon the web, means carried by the support and arranged below the guide for depressing the web, and operating means for said travelling means.

14. In a machine for making sanitary napkins, a combined pad guide, pad feeding and web depressing mechanism for successively feeding pads in spaced relation upon the depressed portion of a travelling web of pad covering material, said mechanism including a support adapted to be arranged over and transversely of the web, a guide carried by the support and through which travels the pad, travelling means for contact with the rear end of a pad for shifting the latter through said guide for depositing it upon the web, means carried by the support and arranged below the guide for depressing the web, operating means for said travelling means, a rotatable pad holding roll arranged forwardly of said mechanism, and an operative drive connection leading from said operating means to said roll for rotating the latter.

15. In a machine for making sanitary napkins, a pad conductor mechanism for conducting pads from a pad forming means to be enveloped by a length of covering material, and conductor mechanism including a tray provided with oppositely extending pairs of upstanding spaced elements forming a pair of oppositely extending rear pad passages, one of the elements of each pair consisting of an endless travelling belt standing on one of its lengthwise edges, said tray further formed with opposed spaced upstanding elements providing a forward pad passage having a part of each of its walls formed of an endless travelling belt standing on one of its lengthwise edges, pad actuated means on the tray for alternately closing the rear passages to the forward passage, means for simultaneously imparting a travelling movement to the belts, pad pushers travelling through said passage, means for simultaneously operating said pushers, and a common driving means for the operating means for the belts and pushers.

16. In a machine for making sanitary napkins, a material feeding mechanism, pad forming means acting upon the material fed from said mechanism, a pad conductor mechanism receiving the pads from said pad forming means, a feeding mechanism for continuously imparting a travelling movement to a web of pad covering material, a combined pad guide, pad feeding and web depressing mechanism for receiving the pads from the conductor mechanism for successively depositing the pads in spaced relation upon the travelling web, a pad holding down roll forwardly of and operated from the said combined pad guide, pad feeding and web depressing mechanism, means acting upon the travelling web for folding the side marginal portions of the web in overlapping relation to encompass the pads deposited on the web by the said combined pad guide, pad feeding and web depressing mechanism, said web feeding mechanism arranged forwardly of said folding means, a weighted cutter mechanism arranged forwardly of the web feeding mechanism for severing the folded travelling web into lengths, and means for synchronously driving said mechanisms.

17. In a machine for making sanitary napkins, a pad conductor mechanism for conducting pads from a pad forming means to be enveloped by a covering material, said mechanism including travelling pad pushers and pad passage forming means between which the pads are conveyed by the pushers, said passage forming means including travelling wall forming portions to prevent clogging or retarding of the pads during the conveying of the latter through the passage forming means.

18. In a machine for producing sanitary napkins, a combined pad guide, pad feeding and web depressing mechanism for depressing a web of pad covering material traveling thereunder and for successively depositing pads in spaced relation from its forward end upon said depressed web, operating means for said mechanism, and a rotatable pad holding down element arranged over the web in proximity to said forward end.

19. In a machine for producing sanitary napkins, a combined pad guide, pad feeding and web depressing mechanism for depressing a web of pad covering material traveling thereunder and for successively depositing pads in spaced relation from its forward end upon said depressed web, operating means for said mechanism, a rotatable pad holding down element arranged over the web in proximity to said end, and means operated from said mechanism for rotating said element.

20. In a machine for producing sanitary napkins, a pad conductor mechanism for conducting pads from a pad forming means to be enveloped by a length of covering material, said mechanism including a front pad passage and a pair of rear pad passages for alternate communication with said front passage, each of said rear passages having stationary and traveling side walls, and said front passage having fixed and traveling side wall portions.

21. In a machine for producing sanitary napkins, a combined pad guide, pad feeding and web depressing mechanism comprising a channel shaped pad guide, a pair of spaced parallel web depressing bars depending from said guide, a pad shifter traveling through said guide, an endless traveling element carrying said shifter, operating means for said element, supporting means for said operating means, and means for suspending said guide and bars above the web.

22. In a machine for producing sanitary napkins, a pad conductor mechanism for conducting pads from a pad forming means to be enveloped by a length of covering material, said mechanism including a front pad passage and a pair of rear pad passages for alternate communication with said front passage, each of said rear passages having stationary and traveling side walls and said front passage having fixed and traveling side wall portions, two sets of pad pushers for shifting the pads through said passages, a pair of endless traveling chains, each carrying a set of pushers, one set of pushers being common to said front and one of the rear passages, the other set being common to said front and the other rear passage, means for simultaneously operating said chains, means for simultaneously operating said traveling side walls and traveling side wall portions, and driving means common to the operating means for the chains and the operating means for said traveling side walls and traveling side wall portions.

23. In a machine for producing sanitary napkins, a pad conductor mechanism for conducting pads from a pad forming means to be enveloped by a length of covering material, said mechanism including a front pad passage and a rear pad passage for communication with the front passage, said front passage having upstanding stationary and upstanding traveling side wall portions, and said rear passage having an upstanding stationary and an upstanding traveling side wall.

24. In a machine for producing sanitary napkins, a pad conductor mechanism for conducting pads from a pad forming means to be enveloped by a length of covering material, said mechanism including a front pad passage and a rear pad passage for communication with the front passage, said front passage having upstanding stationary and upstanding traveling side wall portions, said rear passage having an upstanding stationary and an upstanding traveling side wall, traveling pad pusher means operating through and exteriorly of said passages, operating means for said pad pusher means, means for simultaneously operating said traveling side wall and traveling side wall portions, and a driving means common to the operating means for the pusher means and the operating means for said side wall and side wall portions.

25. In a machine for producing sanitary napkins, a support, a pair of inverted yoke shaped parallel brackets disposed lengthwise of the support and each having a forward and a rear arm, the former being of greater length than the latter and extended forwardly at an upward inclination, a feeding mechanism for a web folded about spaced pads and including a pair of endless traveling superposed elements, each having a depending inclined stretch extending towards said brackets, said stretches arranged in parallelism, the inclined stretch of the lower element being extended beyond the lower end of the other of said inclined stretches between the brackets, pivoted supporting means for the stretch of the upper element carried by said support, pivoted supporting means for the stretch of the lower element carried by the rear arms of the brackets, a stationary cutter secured to said brackets below and in alignment with the lower end of the stretch of the lower element, a rotatable shaft mounted in the forward arms of the brackets, a carrier disposed substantially radially of said shaft and bodily moving with the latter, and a cutter element secured to the outer end of the carrier and coacting with the stationary cutting element for severing the folded web to produce the napkin.

26. In a machine for producing sanitary napkins, a feeding mechanism for a web folded about spaced pads and having its discharge end formed with a pair of depending inclined spaced superposed traveling stretches, the lower one of said stretches extending beyond the lower end of the upper stretch, a pivotal supporting means for the upper stretch, a pair of fixed upstanding substantially U-shaped parallel spaced supports having their front ends inclining forwardly with respect to their rear ends, said lower stretch extending between and to the lower portions of said supports, supporting means for the lower stretch pivoted to the rear ends of said supports, a cutter mechanism including a rotatable and a stationary section coacting with each other to successively sever the web in lengths between the pads to produce the napkins, said stationary section being arranged between the lower portions of said supports directly below the lower end of the lower stretch, and said rotatable section being mounted in the tops of the forward ends of the supports and traveling between the latter to coact with the stationary section.

27. In a machine for producing sanitary napkins, a feeding mechanism for a web folded about spaced pads and having its discharge end formed with a pair of depending inclined spaced superposed traveling stretches, the lower one of said stretches extending beyond the lower end of the upper stretch, a pivotal supporting means for the upper stretch, a pair of fixed upstanding substantially U-shaped parallel spaced supports having their front ends inclining forwardly with respect to their rear ends, said lower stretch extending between and to the lower portions of said supports, supporting means for the lower stretch pivoted to the rear ends of said supports, a cutter mechanism including a rotatable and a stationary section coacting with each other to successively sever the web in lengths between the pads to produce the napkins, said stationary section being arranged between the lower portions of said supports directly below the lower end of the lower stretch, and said rotatable section being mounted in the tops of the forward ends of the supports and traveling between the latter to coact with the stationary section, the lower end of said upper stretch being in alignment with the tops of the rear ends of said supports.

28. In a machine for producing sanitary napkins, a feeding mechanism for a web folded about spaced pads and having its discharge end formed with a pair of depending inclined spaced superposed traveling stretches, the lower one of said stretches extending beyond the lower end of the upper stretch, a pivotal supporting means for the upper stretch, a pair of fixed upstanding substantially U-shaped parallel spaced supports having their front ends inclining forwardly with respect to their rear ends, said lower stretch extending between and to the lower portions of said supports, supporting means for the lower stretch pivoted to the rear ends of said supports, a cutter mechanism including a rotatable and a stationary section coacting with each other to successively sever the web in lengths between the pads to produce the napkins, said stationary section being arranged between the lower portions of said supports directly below the lower end of the lower stretch, said rotatable section being mounted in the tops of the forward ends of the supports and traveling between the latter to coact with the stationary section, and a blower device extending between said supports and having its outlet interposed between said stationary section and the lower end of said lower stretch.

29. In a machine for producing sanitary napkins, a feeding mechanism for a web folded about spaced pads and having its discharge end formed with a pair of depending inclined spaced superposed traveling stretches, the lower one of said stretches extending beyond the lower end of the upper stretch, a pivotal supporting means for the upper stretch, a pair of fixed upstanding substantially U-shaped parallel spaced supports having their front ends inclining forwardly with respect to their rear ends, said lower stretch extending between and to the lower portions of said supports, a cutter mechanism including a rotatable and a stationary section coacting with each other to successively sever the web in lengths between the pads to produce the napkins, said stationary section being arranged between the lower portions of said supports directly below the lower end of the lower stretch, said rotatable section being mounted in the tops of the forward ends of the supports and traveling between the latter to coact with the stationary section, the lower end of said upper stretch being in alignment with the tops of the rear ends of said supports, and a blower device extending between said supports and having its outlet interposed between said stationary section and the lower end of said lower stretch.

30. In a machine for producing sanitary napkins, an open top support, a pair of inverted yoke-shaped spaced parallel brackets disposed lengthwise of the sides of the support and each having a forward and a rear arm, the former being of greater length than the latter and extending forwardly at an upward inclination, a feeding mechanism for a web folded about spaced pads and including a forward end, said mechanism extending downwardly between said brackets and having its forward end positioned in proximity to the lower portions of said brackets, a stationary cutter arranged between said brackets below the lower end of said feeding mechanism, a cutter support arranged between said brackets, a driven shaft mounted in the upper ends of the forward arms of the brackets, a balanced wheel fixed to said shaft, an elongated carrier disposed substantially radially of said shaft, bodily moving with the latter and traveling between said brackets, and a cutter secured to the outer end of the carrier and coacting with the stationary cutter for severing the folded web to produce the napkin.

31. In a machine for producing sanitary napkins, an open top support, a pair of inverted yoke-shaped spaced parallel brackets disposed lengthwise of the sides of the support and each having a forward and a rear arm, the former being of greater length than the latter and extending forwardly at an upward inclination, a feeding mechanism for a web folded about spaced pads and including a forward end, said mechanism extending downwardly between said brackets and having its forward end positioned in proximity to the lower portions of said brackets, a stationary cutter arranged between said brackets below the lower end of said feeding mechanism, a cutter support arranged between said brackets, a driven shaft mounted in the upper ends of the forward arms of the brackets, a balanced wheel fixed to said shaft, an elongated carrier disposed substantially radially of said shaft, bodily moving with the latter and traveling between said brackets, a cutter secured to the outer end of the carrier and coacting with the stationary cutter for severing the folded web to produce the napkin, and a blower device extending between said brackets and having its outlet positioned between the stationary cutter and the forward end of said mechanism.

EDWARD J. O'NEILL.